(12) United States Patent
Xu et al.

(10) Patent No.: US 9,735,668 B2
(45) Date of Patent: Aug. 15, 2017

(54) CONSTANT-VOLTAGE DRIVE DEVICE CAPABLE OF ADJUSTING OUTPUT VOLTAGE

(71) Applicant: ADPOWER Technology (WuXi) Co., Ltd., Wuxi, Jiangsu (CN)

(72) Inventors: Ruopeng Xu, Shanghai (CN); Yongbing Yang, Shanghai (CN); Sen Hu, Zhejiang (CN)

(73) Assignee: ADPOWER TECHNOLOGY (WUXI) CO., LTD., Wuxi (CN)

( * ) Notice: Subject to any disclaimer, the term of this patent is extended or adjusted under 35 U.S.C. 154(b) by 0 days.

(21) Appl. No.: 14/979,506

(22) Filed: Dec. 27, 2015

(65) Prior Publication Data

US 2016/0190913 A1    Jun. 30, 2016

(30) Foreign Application Priority Data

Dec. 31, 2014  (CN) .......................... 2014 1 0849070

(51) Int. Cl.
| | |
|---|---|
| *H02M 5/293* | (2006.01) |
| *H02M 1/42* | (2007.01) |
| *G05F 1/455* | (2006.01) |
| *H02M 1/00* | (2006.01) |
| *H05B 39/04* | (2006.01) |

(52) U.S. Cl.
CPC ......... *H02M 1/4208* (2013.01); *H02M 5/293* (2013.01); *G05F 1/455* (2013.01); *H02M 2001/007* (2013.01); *H02M 2005/2932* (2013.01); *H05B 39/048* (2013.01); *Y02B 70/126* (2013.01)

(58) Field of Classification Search
CPC ... G05F 1/44; G05F 1/445; G05F 1/45; G05F 1/455; H02M 2001/0025; H02M 2001/007; H02M 1/12; H02M 1/42; H02M 1/4208; H02M 5/293; H02M 2005/2935; H05B 39/048
See application file for complete search history.

(56) References Cited

U.S. PATENT DOCUMENTS

| | | | | |
|---|---|---|---|---|
| 9,101,010 | B2* | 8/2015 | Melanson | H05B 33/0806 |
| 2008/0252233 | A1* | 10/2008 | Wu | H05B 41/3924 |
| | | | | 315/291 |
| 2009/0243582 | A1* | 10/2009 | Irissou | H05B 39/08 |
| | | | | 323/320 |
| 2009/0302772 | A1* | 12/2009 | Natarelli | H05B 41/28 |
| | | | | 315/200 R |

(Continued)

*Primary Examiner* — Fred E Finch, III

(57) ABSTRACT

A constant-voltage drive device capable of adjusting output voltage includes a chopping wave structure, an AC power voltage detection module, an AC voltage signal bias module, a power factor correction controller with multiplier, a power factor correction and energy conversion and transmission module, an output control module, a reference signal generation module, an AC power phase angle detection module and a phase angle information transmission module. The output voltage can be both constant and adjustable, so that the output changes with the phase angle information of input, and also provides the chopping wave structure with current for proper functioning. The device is applicable for bigger power range with better compatibility and stronger adaptability.

4 Claims, 2 Drawing Sheets

(56) References Cited

U.S. PATENT DOCUMENTS

| | | | |
|---|---|---|---|
| 2011/0285301 A1* | 11/2011 | Kuang | H05B 33/0845 315/200 R |
| 2011/0291577 A1* | 12/2011 | Anissimov | H05B 41/295 315/224 |
| 2012/0043946 A1* | 2/2012 | Dong | H02M 3/156 323/234 |
| 2012/0286663 A1* | 11/2012 | Puvanakijjakorn | H05B 33/0845 315/85 |
| 2014/0265880 A1* | 9/2014 | Taipale | H05B 37/0263 315/158 |
| 2014/0265935 A1* | 9/2014 | Sadwick | H05B 33/0815 315/307 |
| 2015/0062985 A1* | 3/2015 | Colbeck | H02M 1/42 363/89 |
| 2016/0029455 A1* | 1/2016 | Aydin | H05B 33/0827 315/193 |
| 2016/0330808 A1* | 11/2016 | Brandt | H05B 33/0845 |
| 2016/0374168 A1* | 12/2016 | Ackmann | H05B 33/0845 |

* cited by examiner

CONSTANT-VOLTAGE DRIVE DEVICE CAPABLE OF ADJUSTING OUTPUT VOLTAGE

CROSS-REFERENCE TO RELATED APPLICATIONS

The present application claims the benefit of Chinese Patent Application No. 201410849070.4 filed on Dec. 31, 2014, the contents of which are hereby incorporated by reference.

BACKGROUND OF THE INVENTION

1. Field of the Invention

The Invention relates to a voltage drive device, in particular to a constant-voltage drive device capable of adjusting output voltage.

2. Description of Related Art

So far, because of the narrow adjustment range, poor compatibility and narrow load power range, if we use a constant voltage drive device like LED light to obtain a better adjustment effect on adjusting the output voltage according to the chopping wave angle, we need to make the light band of specific power match with drive power source of special parameter for constant voltage dimming.

The output control method for the existing voltage drive device is to control the output power, i.e., in the case of LED light dimming, both the output current and voltage are changing so that the color spectrum of LED light changes accordingly with an unsatisfied application effect.

SUMMARY OF THE INVENTION

The purpose of the Invention is to make up for the defects of the prior art, providing a constant-voltage drive device capable of adjusting output voltage to ensure that the output changes with the phase angle information of input so as to realize higher input power factor, lower total harmonic distortion and better compatibility.

The technical scheme to achieve the above object is that:

A constant-voltage drive device capable of adjusting output voltage of the Invention, comprising a chopping wave structure, an AC power voltage detection module, an AC power phase angle detection module, a phase angle information transmission module, an AC voltage signal bias module, a reference signal generation module, a power factor correction controller with multiplier, a power factor correction, energy conversion and transmission module and an output control module, wherein:

the chopping wave structure is connected to the AC power voltage detection module, the AC power phase angle detection module and the power factor correction, energy conversion and transmission module respectively;

the AC power voltage detection module, the AC voltage signal bias module, the power factor correction controller with multiplier, the power factor correction, energy conversion and transmission module and the output control module are connected in turn; the reference signal generation module is connected to the power factor correction controller with multiplier;

the AC power phase angle detection module and the phase angle information transmission module and the output control module are connected in turn.

The above constant-voltage drive device capable of adjusting output voltage, wherein, the AC power phase angle detection module is a conduction angle detection module.

The above constant-voltage drive device capable of adjusting output voltage, wherein, the phase angle information transmission module is a conduction angle information transmission module.

The above constant-voltage drive device capable of adjusting output voltage, wherein, the power factor correction, energy conversion and transmission module is a single-stage structure with common magnetic components.

The above constant-voltage drive device capable of adjusting output voltage, wherein, the power factor correction, energy conversion and transmission module is a two-stage structure with different magnetic components.

The above constant-voltage drive device capable of adjusting output voltage, wherein, the reference signal generation module is a fixed signal generation module.

The above constant-voltage drive device capable of adjusting output voltage, wherein, the reference signal generation module is a variable signal generation module.

The above constant-voltage drive device capable of adjusting output voltage, wherein, the output control module is a module comprising MOSFET element.

The above constant-voltage drive device capable of adjusting output voltage, wherein, the output control module is a module comprising adjustable and constant voltage control chips for voltage output.

The advantages of the Invention lie in that by the constant-voltage drive device capable of adjusting output voltage the Invention provides, the voltage information through the chopping wave structure can control the power factor correction, energy conversion and transmission module after it is processed by the power factor correction chips with multiplier module, the output voltage is not only constant but also adjustable, ensuring that the output changes with the phase angle information of input while providing the chopping wave structure with current for proper functioning, thus realizing higher input power factor (PF), lower total harmonic distortion (THD) and better compatibility; by adjusting and processing the phase angle information of input voltage to control the output voltage, the voltage adjustment depth of less than 1% and good compatibility exceeding 10%-100% load range can be realized; the Invention is applicable for bigger power range with better compatibility and stronger adaptability.

DETAILED DESCRIPTION OF THE INVENTION

Detailed description for the Invention is presented below in combination with the drawings.

Figure 1:
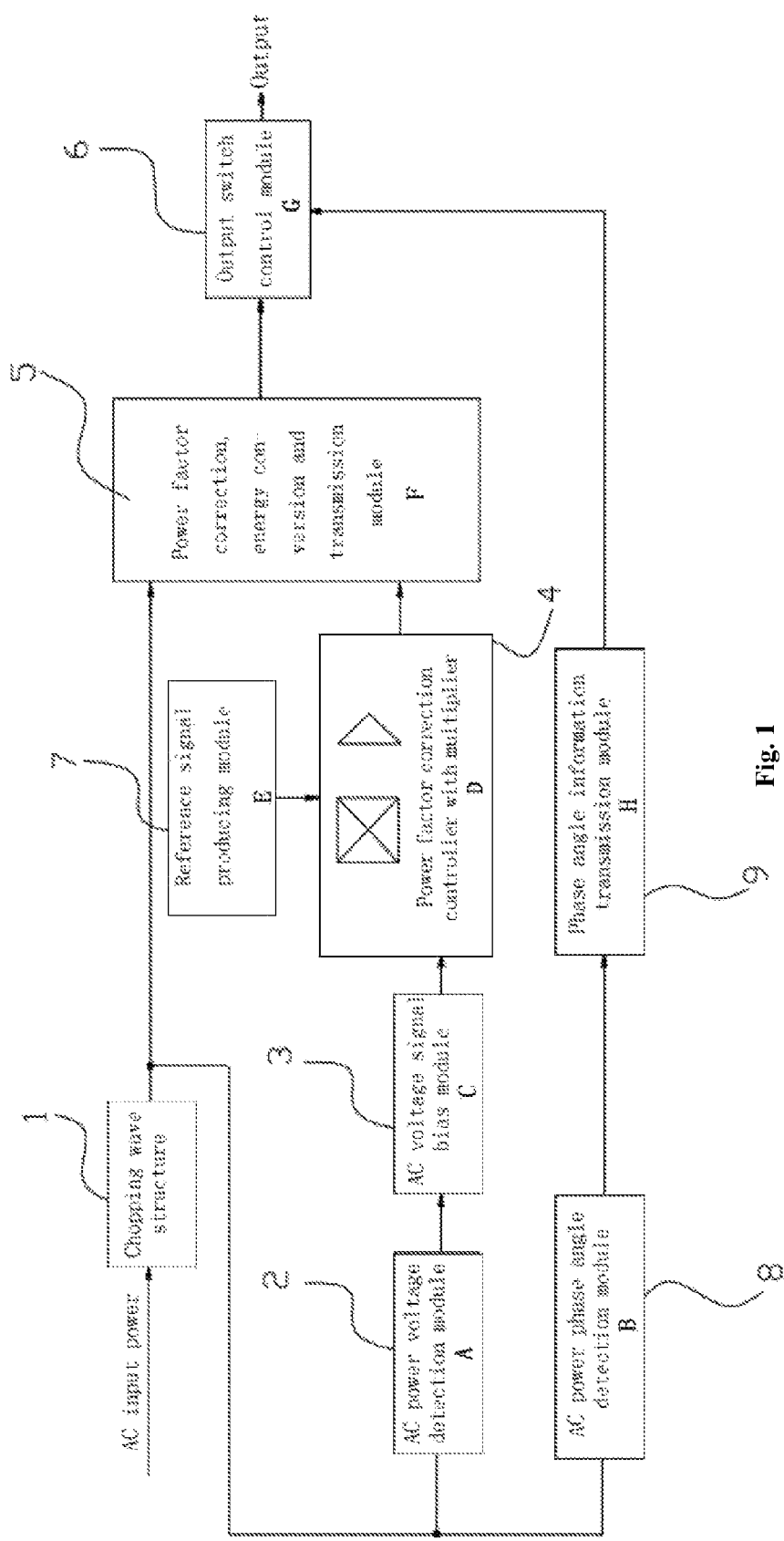
FIG. 1 is the structural schematic diagram of a constant-voltage drive device capable of adjusting output voltage of the Invention.
Figure 2:
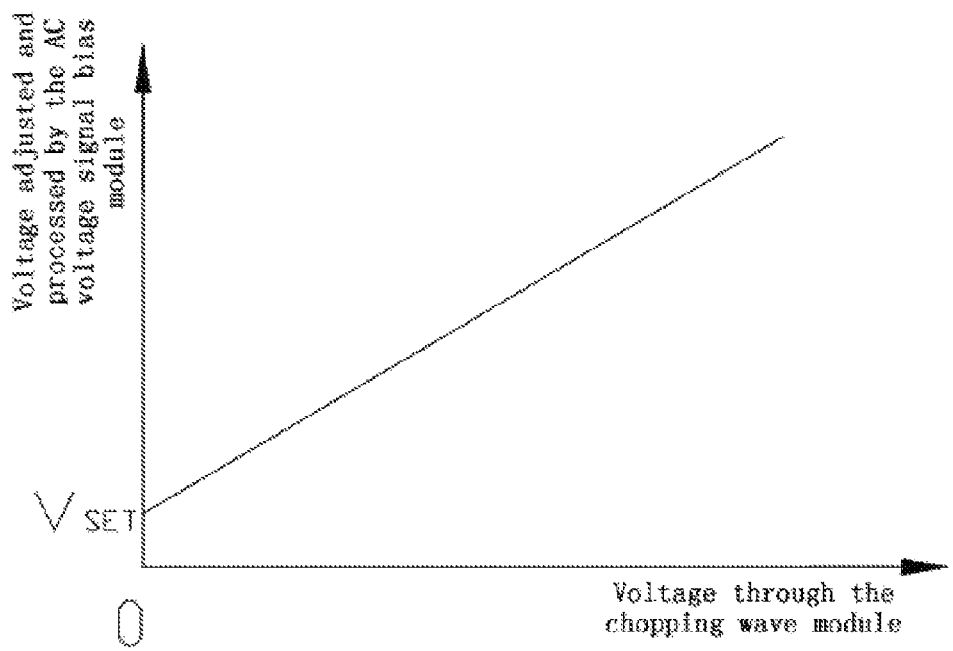
FIG. 2 is the relationship diagram for voltage through the chopping wave structure and that adjusted by the AC voltage signal bias module.
Figure 3:
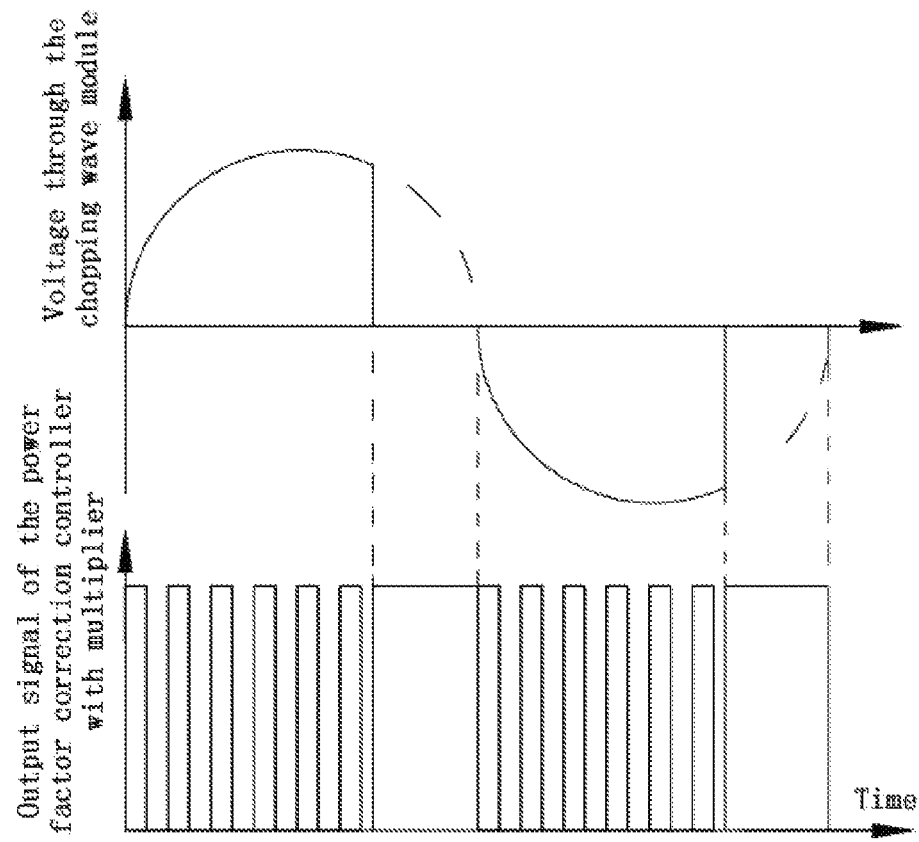
FIG. 3 is the performance comparison diagram changing with time for voltage through the chopping wave structure and output signal of power factor correction controller with multiplier.

A constant-voltage drive device capable of adjusting output voltage of the Invention, comprising a chopping wave structure 1, an AC power voltage detection module 2, an AC voltage signal bias module 3, a power factor correction controller with multiplier 4, a power factor correction, energy conversion and transmission module 5, an output control module 6, a reference signal generation module 7, an AC power phase angle detection module 8 and a phase angle information transmission module 9. (Please refer to FIG. 1, FIG. 2 and FIG. 3.)

The chopping wave structure 1 is connected to the AC power voltage detection module 2, the AC power phase angle detection module 8 and the power factor correction, energy conversion and transmission module 5 respectively.

The AC power voltage detection module 2, AC voltage signal bias module 3, power factor correction controller with multiplier 4 and the power factor correction, energy conversion and transmission module 5 and the output control module 6 are connected in turn; and the power factor correction controller with multiplier 4 is connected to the reference signal generation module 7.

The AC power phase angle detection module 8, the phase angle information transmission module 9 and the output control module 6 are connected in turn. Wherein, the AC power phase angle detection module 8 can be an average voltage detection module, and the phase angle information transmission module 9 is an average voltage transmission module accordingly.

The chopping wave structure 1 chops the input AC voltage in the case that AC voltage is input to the device of the Invention. The chopped voltage detects the voltage information of AC power through the AC power voltage detection module 2, and is adjusted and transmitted to the power factor correction controller with multiplier 4 through the AC voltage signal bias module 3, then the reference signal generation module 7 generates reference information and transmits to the power factor correction controller with multiplier 4, and thus the power factor correction controller with multiplier 4 controls the duty ratio of the switch based on the reference signal and the AC power voltage detection signal biased by the AC voltage signal bias module 3, so as to realize the result that the system input current changes with the input voltage. The power factor correction controller with multiplier 4 performs power factor correction, and provides the chopping wave structure 1 with current for proper functioning through the same circuit as that for the power factor correction. The reference signal from the reference signal generation module 7 can be either a fixed signal or a variable signal as required. The function of AC voltage signal bias module 3 is to ensure that the output voltage signal of power factor correction controller with multiplier 4 is always higher than 0V in the case that the phase of AC power is switched for conducting the MOS transistor for power factor correction, so as to provide the chopping wave structure 1 with a stable discharge loop.

The function of power factor correction, energy conversion and transmission module 5 is to perform power factor correction to the AC input voltage, convert to appropriate voltage and transmit to the output control module 6, so that the output control module 6 can control the output voltage based on the AC power phase angle information transmitted by the phase angle information transmission module 9, and the output voltage can change within the range from zero to the rated voltage based on the phase angle information, so as to realize steady operation within the bigger load power range and adjustment range. The power factor correction, energy conversion and transmission module 5 can be either a single-stage structure with a common magnetic component or a two-stage structure with different magnetic components. The existing switch power can be the energy conversion and transmission module, but the power factor correction, energy conversion and transmission module 5 can realize power factor correction for the rectified high voltage DC power, and convert it into constant voltage power to transmit to the output control module 6, so as to provide the chopping wave structure 1 with a stable discharge loop.

The output control module 6 adjusts the output voltage according to the conduction angle of AC input power. It can be either an output control module that applies MOSFET, and the output voltage changes with that of the energy conversion and transmission module in the case of conduction for the output control module 6; or an output control module that the constant voltage control chips control the output voltage, which can control the output voltage from the constant-voltage output chips and the output voltage keeps constant. By controlling the output voltage, the output control module 6 can easily connect to the digital processing chips and realize more functions so as to meet different requirements.

In the Invention, the output voltage is not only constant but also adjustable after the input voltage information is processed by the power factor correction controller with multiplier module 4, which both ensures that the output changes with the phase angle information of input, and also provides the chopping wave structure 1 with standby current, so as to realize higher input power factor (PF), lower total harmonic distortion (THD) and better compatibility with the chopping wave structure 1. By controlling the output via the output control module 6, the Invention will not make the LED light band produce any LED color spectrum deviation. The Invention is applicable for bigger power range with better compatibility and stronger adaptability.

The above Embodiments combining with figures have described the Invention in details. A person skilled in the art can obtain various modified examples based on the above description. Any modifications, equivalent replacements and improvements made within the spirit and rule of the Invention shall be included in the protection scope of the Invention. Therefore, some details in the Embodiments shall not lead to any limits to the Invention, and the protection scope of the Invention shall be the scope specified in the attached Claims.

What is claimed is:

1. A constant-voltage drive device with adjustable output voltage, comprising a chopping wave structure, an AC power voltage detection module, an AC voltage signal bias module, a power factor correction controller with multiplier, a power factor correction, energy conversion and transmission module, an output control module, a reference signal generation module, an AC power phase angle detection module and a phase angle information transmission module, wherein:

the AC power voltage detection module, the AC power phase angle detection module and the power factor correction, energy conversion and transmission module are respectively and directly connected to the chopping wave structure;

the AC power voltage detection module, the AC voltage signal bias module, the power factor correction controller with multiplier, the energy conversion and transmission module and the output control module are connected in series; the reference signal generation module is connected to the power factor correction controller with multiplier;

the AC power phase angle detection module, the phase angle information transmission module and the output control module are connected in series.

2. The constant-voltage drive device according to claim 1, wherein the reference signal generation module is a fixed signal generation module.

3. The constant-voltage drive device according to claim 1, wherein the reference signal generation module is a variable signal generation module.

4. The constant-voltage drive device according to claim 1, wherein the AC voltage signal bias module is configured to ensure that an output voltage signal of the power factor correction controller with multiplier is always higher than 0V in the case that phase of AC power is switched so as to provide the chopping wave structure with a stable discharge loop.

* * * * *